April 6, 1948. D. G. ROOS 2,439,187
APPARATUS FOR FLUSHING FOREIGN MATTER FROM BEARINGS
Filed June 17, 1943 2 Sheets-Sheet 2
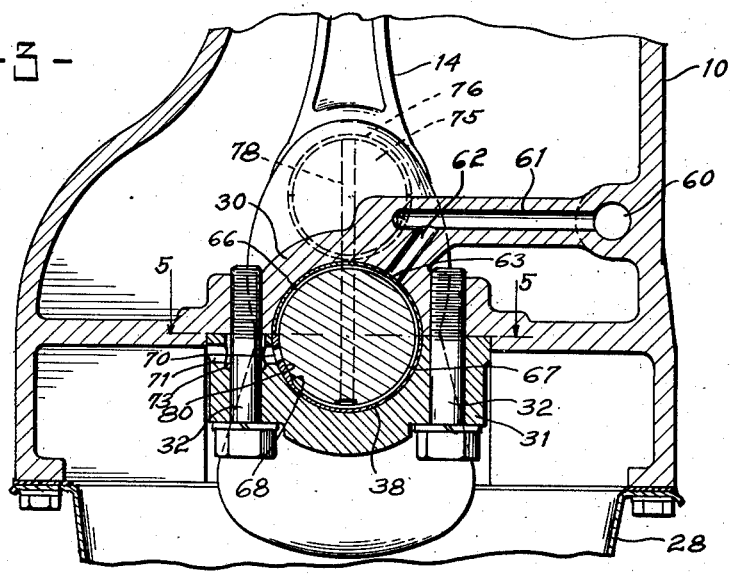
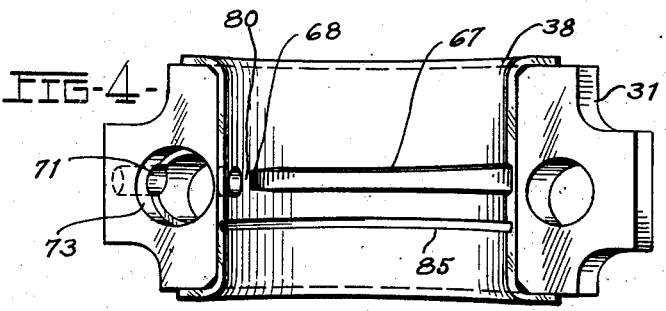
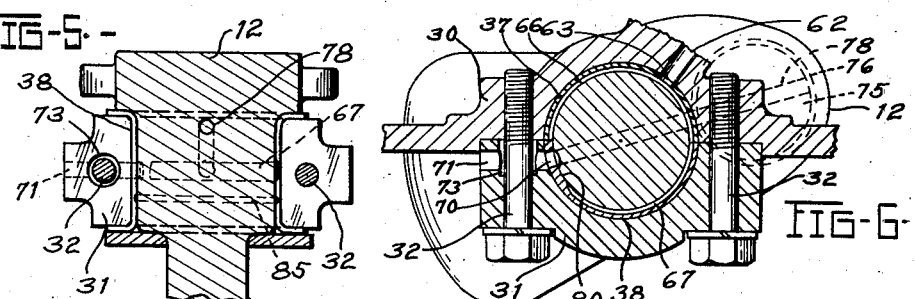
INVENTOR.
Delmar G. Roos
BY Harry O. Ernsberger
ATTORNEY Patented Apr. 6, 1948

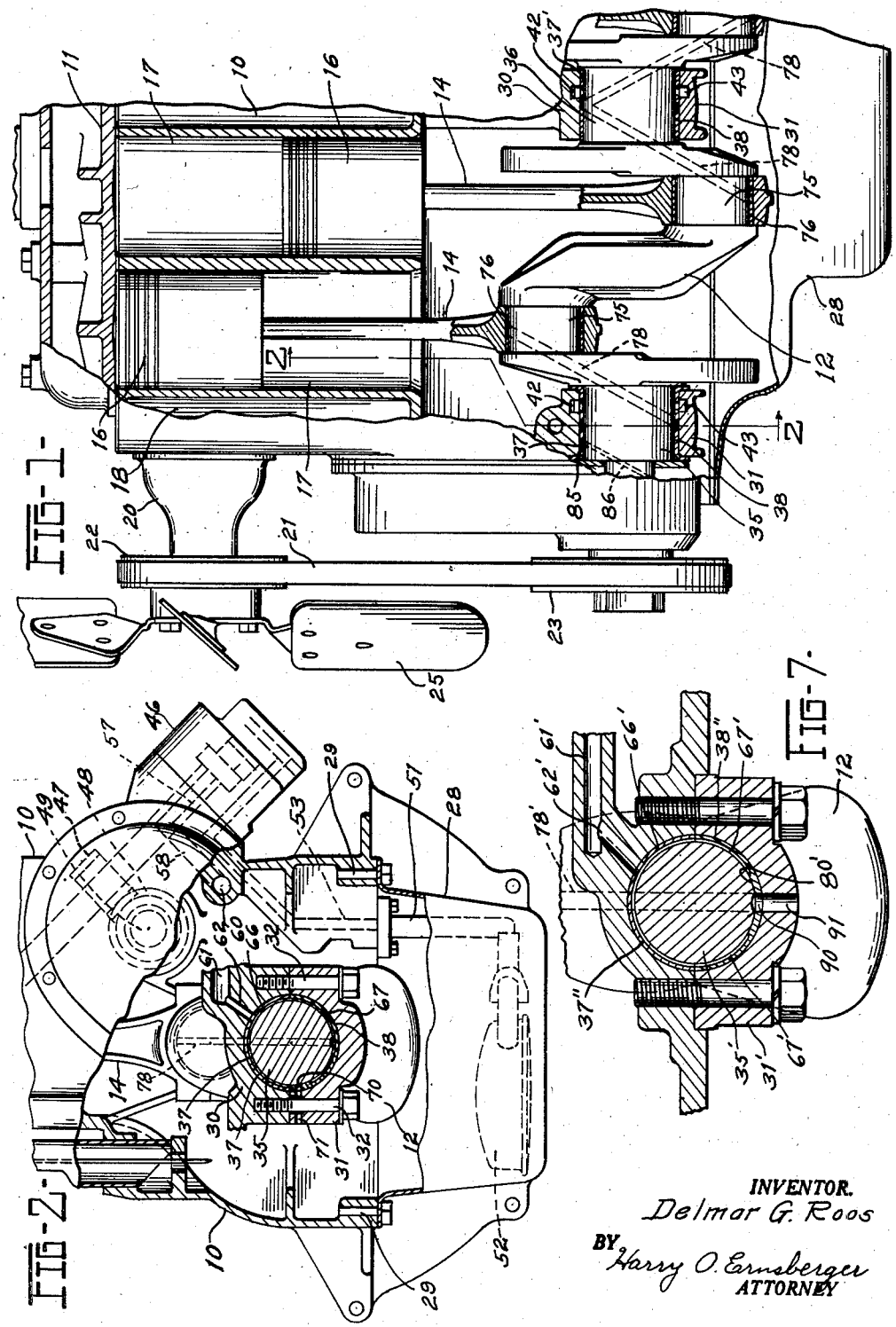

2,439,187

UNITED STATES PATENT OFFICE 2,439,187

APPARATUS FOR FLUSHING FOREIGN MATTER FROM BEARINGS

Delmar G. Roos, Toledo, Ohio, assignor to Willys-Overland Motors, Inc., Toledo, Ohio, a corporation of Delaware Application June 17, 1943, Serial No. 491,242

8 Claims. (Cl. 184—6)

This invention relates to an apparatus for flushing or removing chips and other foreign matter from bearings of mechanisms.

The invention embraces the provision of means for effecting the removal of foreign matter from bearings of mechanisms while in operation without materially affecting the lubrication of such bearings.

The invention contemplates the provision of apparatus for flushing chips and foreign matter from bearings of crankshafts wherein a system of pressure lubrication is utilized for lubricating such bearings.

An object of the invention is the provision of a simple yet effective arrangement whereby a lubrication duct for a bearing structure may be periodically vented to effect a removal of foreign matter from the bearing.

Another object of the invention resides in an arrangement whereby a lubricant conveying duct in a crankshaft of an engine or the like which forms a component part of a system of pressure lubrication to the bearing is periodically relieved of lubrication pressure during rotation of crankshaft to facilitate the flushing from the duct of chips, dirt and other foreign matter from the bearing.

Still another object is the provision of means of flushing foreign matter from bearings during operation of the mechanism which may be incorporated in engines or the like by modifying the bearings and bearing supports.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a portion of an internal combustion engine certain parts being shown in section;

Figure 2 is a vertical sectional view taken substantially on the line 2—2 of Figure 1;

Figure 3 is a transverse sectional view through one of the crankshaft bearings illustrating the details of a form of my invention;

Figure 4 is a perspective view of a bearing means and support therefor showing a form of venting means of the invention;

Figure 5 is a horizontal sectional view taken substantially on the line 5—5 of Figure 3, and Figure 6 is a view illustrating a portion of the structure of Figure 3 showing the crankshaft duct in vented position;

Figure 7 is a sectional view through a crankshaft bearing illustrating a modified form of my invention.

While I have illustrated my invention as incorporated in an engine of the internal combustion type, it is to be understood that I contemplate the use of my invention with any mechanism wherein the same may be found to have utility.

Referring to the drawings in detail, the engine construction illustrated is inclusive of a cylinder block 10, cylinder head 11, a crankshaft 12 which is connected by means of connecting rods 14 with pistons 16 which are arranged for reciprocating movement in cylinders 17. A water jacket 18 is provided adjacent the cylinders to facilitate removal of excess heat from the engine, a water pump being enclosed within a housing 20 and driven by a belt 21 through pulleys 22 and 23 serves to effectively circulate the cooling water. A fan 25 also driven by a belt 21 serves to establish a circulation of air through a water cooling radiator (not shown).

Positioned beneath the cylinder block 10 is a crankcase or receptacle 28 which is secured to the cylinder block by means of bolts 29, the crankcase serving as an oil or lubricant reservoir adapted to contain a substantial quantity of oil for lubricating the engine in a manner to be hereinafter set forth.

The crankshaft 12 is supported in the cylinder block by means of a plurality of spaced bearing constructions, two of which are illustrated in Figure 1. Each bearing arrangement is inclusive of a portion 30 preferably integrally cast with the cylinder block and which is arranged to cooperate with bearing caps or supports 31 which are secured to portions 30 by means of cap screws 32, the threaded ends of the cap screws extending into threaded openings formed in the portions 30. The crankshaft 12 is fabricated with journal portions 35 and 36 which are each mounted in bearings 37—38 and 37'—38'. Each set of bearings are formed in halves, the upper halves 37 and 37' engaging in semi-cylindrical recesses formed in the portions 30 of the cylinder block while the lower bearing halves 38 and 38' are mounted in semi-cylindrical configurations formed in the bearing caps 31. The upper bearing halves 37 and 37' are prevented from relative movement by means of dowels 42 and the lower bearing halves 38 and 38' are held in place by means of dowels 43.

The oiling system employed in an engine of the character illustrated is of the so-called pressure type. The engine is provided with an oil pump contained within a housing 46, the pump being driven by suitable gear 47 meshing with a drive gear 48 on the engine camshaft 49. A bracket 51 supported by the cylinder block extends into the crankcase 28 and pivotally carried at its lower extremity is a floating type oil filter 52. Oil or lubricant is drawn by the pump through the inlet channel 53 leading from the filter 52 to the pump, the latter discharging through channels 57 and 58 to a duct 60 extending longitudinally of the cylinder block as shown in Figures 2 and 3. The duct 60 is in communication with ducts or channels 61 and 62 which convey oil to the journals 35 of the crankshaft, the upper bearing halves 37 and 37' each being formed with an opening 63 to permit the flow of oil to the interior bearing surface as shown in Figure 3.

Each of the upper bearing members 37 and 37' is formed with a lubricant conveying channel or groove 66 and each lower bearing member 38 is formed with a channel 67 one end of the latter channel being in registration with the channel 66 of the upper bearing member. As particularly illustrated in Figures 3 and 4, the channel 67 does not extend entirely around the bearing but terminates at a point indicated at 68. Arranged above and spaced from the terminus 68 of the groove 67 is a laterally extending opening 70 in the bearing which is in registration with an opening 71 drilled or bored transversely in the bearing cap 31. The opening in the bearing cap which admits one of the cap screws 32 is counterbored or enlarged as at 73. The openings 70 in bearing halves 38 and 38', the transverse bores 71 in the bearing caps and the counterbores 73 form vents or passageways from the interior of the bearing surfaces to the exterior of the bearing caps. Thus the vents are at atmospheric pressure.

The pistons 16 are connected through the rods 14 with crankpins 75 of the crankshaft through suitable bearings 76 as particularly shown in Figure 1. These connecting rod bearings 76 receive lubrication from the grooves or ducts 66 and 67 in the main crankshaft bearings through the provision of ducts or channels 78 drilled in the arms of the crankshaft. As particularly shown in Figure 3 the duct 78 terminates centrally in the main bearing journal and is adapted during rotation of the crankshaft to communicate or register with grooves 66 and 67 in the crankshaft bearings. Through this arrangement the oil in the grooves 66 and 67 is under pressure provided by the oil pump, which pressure is impressed upon oil in the duct 78 so that the oil is fed to the connecting rod bearings throughout the major period of rotation of the crankshaft, i. e. as long as duct 78 is in communication with grooves 66 and 67. When the crankshaft has reached the position during rotation where the extremity of duct 78 is opposite the bearing surface or land indicated at 80, the duct 78 is out of communication with the groove 67 in bearing half 38 and due to the clockwise rotation of the crankshaft as viewed in Figure 3, chips, dirt and other foreign matter tend to be carried by the oil circumferentially in the groove 67 and accumulate or lodge in the extremity of the duct 78. The land 80 acts as a valve to sever oil pressure communication with the duct 78. Upon further rotation of the crankshaft the extremity of duct 78 passes over the land 80 and registers with the opening 70 in the bearing half 38 as shown in Figure 6 so that the duct 78 is momentarily vented to the atmosphere through the medium of openings 70 and 71 and the counterbore 73. As the duct 78 in this position is not subjected to the pressure from the oil pump, and under the influence of centrifugal force of the rotating crankshaft about its axis, a small amount of oil and foreign matter accumulated in the extremity of duct 78 are thrown outwardly through the vent openings 70—71—73 away from the surface of the bearing half 38. By this means any chips or foreign matter collected in the extremity of the duct 78 are extruded through the vent openings 70 and 71 and counterbore 73, passing to the exterior of the bearing cap 31 falling into the crankcase or sump 28. The chips and foreign matter drop to the bottom of the crankcase 28 and hence are out of the path of the circulating oil.

Further slight rotation of the crankshaft moves the duct 78 out of registration with the vent and re-establishes communication of the duct with groove 66 in bearing 37 so that oil pressure is effective on duct 78 to convey lubricant to the connecting rod bearings.

The journal 36 of the crankshaft carried in bearing halves 37' and 38' is similar to journal 35 except that two ducts 78 convey oil to the connecting rods arranged adjacent each side of the journal bearing construction.

Through this arrangement as above described I have provided an inexpensive yet very effective apparatus for flushing any accumulation of chips, dirt or other foreign matter through the vent openings during each revolution of the crankshaft, this flushing action proceeding continuously during the operation of the engine or mechanism. I have found that the scoring of bearings due to the presence of foreign matter in the circulating oil is practically eliminated by the present invention and hence, the life of the bearings greatly increased.

The bearing half 38 being at the forward end of the engine is provided with a narrow groove 85 in which oil may accumulate and pass through a duct 86 to lubricate the timing chain (not shown) which serves to drive the cam shaft 49.

In the form of the invention as above described, the vent is arranged laterally as this point on the bearing is most remote from the source of oil pressure and therefore of lowest pressure existing in the bearing.

Figure 7 illustrates a modified form of my invention wherein the lower bearing half 38'' is provided with an opening 90 registering with an opening 91 vertically arranged in the main bearing cap 31', these openings forming a venting means. The bearing half 38'' is formed with grooves 67' which terminate at points 68'. The lubricant is fed to groove 66' in the upper bearing member 37' through the duct 61' and 62'.

In this form of the invention the duct 78' throughout the major portion of rotation of the crankshaft journal 35' is in registration with the grooves 66' and 67' and thus contains oil under pressure which is forced to the connecting rod bearings. However, during rotation of the crankshaft journal, the duct 78' is brought into registration with a land or ungrooved portion 80' of the bearing half 38'' in which position the duct 78' is not subjected to oil pressure, the land 80' serving as a valve to close the duct 78' and sever this oil pressure connection. Upon further slight rotation of the crankshaft, the duct 78' registers with the vent formed by openings 90 and 91 in the bearing member and cap respectively so that any accumulation of dirt or foreign matter collected in the terminus of duct 78' will be discharged from the duct into the vent. A small amount of lubricant is discharged with each venting cycle but upon further slight rotation of the crankshaft, the duct 78' is again brought into communication with the groove 67' and oil pressure reestablished in the duct for conveyance to the connecting rod crankpin bearing in communication with duct 78'.

It is apparent that within the scope of the invention, modifications and different arrangements may be made other than is herein disclosed, and the present disclosure is illustrative merely, the invention comprehending all variations thereof.

What I claim is:

1. In combination; a crankshaft having a journal, a bearing; a connecting rod connected to said crankshaft; a bearing for connecting said connecting rod to the crankshaft; a groove in said crankshaft journal bearing extending throughout a portion of the circumference of said bearing; means connecting said groove with a supply of lubricant; a duct in said crankshaft having one end in normal communication with the groove in said journal bearing, said duct arranged to convey lubricant to the connecting rod bearing; a vent opening arranged in the non-grooved portion of said journal bearing in circumferential alignment with the groove therein, said duct being arranged to register with said vent opening during each revolution of the crankshaft.

2. In combination; a crankshaft having a journal bearing; a bearing cap for securing said journal bearing in position, said bearing having a groove extending throughout a major portion circumferentially thereof; an opening formed in the wall of the ungrooved portion of said bearing and lying in the plane of the groove therein; said bearing cap having an opening in registration with the opening in said bearing, a lubricating duct in said crankshaft and having one end normally in registration with the groove in said bearing whereby oil in said groove is conveyed to said duct; said duct being arranged to register with the opening in said bearing and bearing cap during each revolution of the crankshaft for venting said duct to the atmosphere.

3. In combination; a journal bearing having a lubricant channel extending throughout a major portion circumferentially thereof, said bearing having an opening through the wall thereof in circumferential alignment with the lubricant channel and in the non-channelled portion of the bearing, a cap supporting said bearing, said cap having spaced openings to receive bolts for securing said cap in position, one of the openings in said cap having a counterbore, and a transversely arranged opening in said cap in registration with the counterbore and the opening in the wall of said bearing forming a vent for said bearing.

4. In combination; a journal bearing formed of two semi-cylindrical elements, a groove extending circumferentially throughout the inner surface of one of said elements, a groove extending circumferentially throughout a portion of the inner surface of the other element, a vent opening through the wall of latter element in the ungrooved portion thereof and arranged in the plane of the groove formed in said element; and a bearing support for said bearing having an opening therethrough in registration with the vent opening in said element.

5. In combination; a crankshaft having a journal; a bearing therefor having a lubricant channel therein for conveying lubricant to said journal; said crankshaft having a crankpin; a connecting rod bearing therefor; a duct for conveying lubricant from said journal bearing to said connecting rod bearing; said duct being arranged for periodic communication with said channel during rotation of said journal; and means for venting the entrance to said duct when the same is out of communication with said channel.

6. In combination; a crankshaft having a journal; a bearing therefor having a lubricant channel therein for conveying lubricant to said journal; said bearing having a vent opening out of communication with said channel; and a lubricant conveying duct in said journal arranged for successive communication with said channel and vent opening during each rotation of said journal.

7. In an oiling system for bearings, a journal; a bearing therefor wherein oil is fed to the bearing under pressure; said bearing having a vent to the atmosphere; said journal having an oil duct therein normally containing oil under pressure; said oil duct and vent being so arranged that during each revolution of the journal the entrance of said duct and vent in the bearing are brought into registration whereby foreign material in the duct may pass through said vent and out of said bearing.

8. In combination, a crankshaft; a journal bearing therefor; a connecting rod connected to said crankshaft; a bearing therefor; means including a pair of channels normally in intercommunication throughout a major portion of a revolution of said crankshaft for conveying oil under pressure to said crankshaft journal and connecting rod bearings; a vent for one of said channels arranged to register therewith at least once during each revolution of said crankshaft; said channel being in registration with said vent when said vented channel is out of communication with the other of said channels.

DELMAR G. ROOS.

REFERENCES CITED

The following references are of record in the file of this patent:

UNITED STATES PATENTS

| Number | Name | Date |
|---|---|---|
| 1,291,839 | Gorham | Jan. 21, 1919 |
| 1,872,194 | Summers | Aug. 16, 1932 |
| 1,948,340 | Dolza | Feb. 20, 1934 |